United States Patent [19]

Fish

[11] 3,868,442

[45] *Feb. 25, 1975

[54] ALUMINA EXTRACTION

[75] Inventor: William M. Fish, Pittsburgh, Pa.

[73] Assignee: Aluminum Company of America, Pittsburgh, Pa.

[*] Notice: The portion of the term of this patent subsequent to Aug. 1, 1989, has been disclaimed.

[22] Filed: Sept. 6, 1972

[21] Appl. No.: 286,813

[52] U.S. Cl. .............................. 423/121, 423/123
[51] Int. Cl. ........................................... C01f 7/06
[58] Field of Search.................... 423/121, 123, 127

[56] References Cited
UNITED STATES PATENTS

| 3,413,087 | 11/1968 | Roberts | 423/123 X |
| 3,481,705 | 12/1969 | Peck et al. | 423/118 |
| 3,579,294 | 5/1971 | Tamise et al. | 423/123 X |
| 3,579,295 | 5/1971 | Tamise et al. | 423/123 X |
| 3,681,013 | 8/1972 | Fish | 423/625 X |

Primary Examiner—Herbert T. Carter
Attorney, Agent, or Firm—Abram W. Hatcher; John P. Taylor

[57] ABSTRACT

Separation of caustic slurry of bauxite into two fractions, a high solids fraction of which rejoins the other after the other has been conducted through one or more tubular heaters, a new or reconstituted stream containing both fractions thereafter entering one or more pressure digesters.

8 Claims, 2 Drawing Figures

ALUMINA EXTRACTION

BACKGROUND OF THE INVENTION

1. Field of the Invention

This invention relates to caustic extraction of alumina from bauxite. More particularly, it relates to preliminary treatment of caustic liquor prepared from bauxite.

2. Description of the Prior Art

In the conventional Bayer or modified Bayer process, wherein alumina hydrate is precipitated from a supersaturated solution of alumina in caustic, spent liquor produced by separation of precipitated hydrate typically has an alumina to caustic (reported as $Na_2CO_3$) ratio of 0.33, with caustic at about 170 g/l. At an atmospheric boiling point of about 220°F the equilibrium solubility rate increases to about 0.48. Conventional pressure digestion may be operated to give alumina to caustic ratios of about 0.63. Since the atmospheric boiling solubility ratio is just midway between spent liquor and final digestion ratios, half of the total alumina digested can be solubilized in an atmospheric digest, for example, as in the process of my U.S. Pat. No. 3,681,013.

In typical American Bayer practice, the spent liquor from precipitation is heated in stages by heat exchange, with high-temperature "green" liquor leaving digestion. While the major portion of the liquor is heated indirectly to avoid dilution, a portion of the spent liquor may be bled off at a suitable temperature from the indirectly heated stream and used to form a slurry with ground bauxite being charged to digestion. In such case, the remainder of the liquor is subjected to further indirect heat exchange and final heating with live steam in tubular heaters and joins the slurry stream for final heating in direct contact heaters.

When a two-stage digest such as that described in above-mentioned U.S. Pat. No. 3,681,013, is used, the liquor leaving the atmospheric digest contains alumina dissolved from a coarse bauxite fraction, a partially leached fine bauxite fraction, and silica dissolved from the entire bauxite charge. This liquor, without further treatment, may result in excessive erosion or scaling, particularly when the tubular heaters have thin walls. One approach to this problem is to use direct contact reheating. However, if the entire liquor stream is heated in this manner, excessive dilution may result.

Thus it can readily be seen that a problem exists in that slurries resulting from caustic treatment of bauxite, particularly high-silica bauxite, oftentimes result in severe erosion of indirect heat exchange (non-contact type or non-contact) heaters, for example, those of the tubular variety, through which slurry or liquor is conducted, especially while being brought to or kept at desired temperatures and pressures.

SUMMARY OF THE INVENTION

After extended investigation I have found that such erosion can be considerably lessened by separating the slurry coming from preliminary caustic treatment of bauxite into two portions, one of which is low in solids, containing mostly fines and including much of the silica in the form of a desilication product (DSP), and the second of which is a high-solids portion containing coarser particulate matter. The low-solids fines portion is conducted through one or more tubular heaters before additional processing. The coarse or high-solids portion is rejoined by the fines or low-solids portion, which has been heated so as to provide sufficient heat to the high-solids portion for further digestion. Before being rejoined by the low-solids fines portion, the high-solids coarse portion may be heated, if desired, by passing through direct contact heaters. This by-passing of the tubular heaters by the high-solids coarse portion of the slurry from caustic treatment of bauxite also permits control of the digestion ratio, that is, the ratio of alumina to caustic in the pressure digester. A further advantage of bauxite slurry separation and reunion steps prior to further treatment is the provision of additional liquor-solids contacting for desilication.

According to my invention, more specifically, after removal of a leached coarse bauxite fraction, alumina enriched liquor containing a finer bauxite fraction and dissolved silica is conducted to one or more holding and settling tanks to provide sufficient time to complete a major portion of the desilication reaction by combination of dissolved silica with alumina and caustic in the liquor to form insoluble sodium aluminum silicate, DSP. Settling rates are adjusted so as to permit only very fine muds including DSP to overflow the holding tanks, while accumulating the coarser solids as a thick slurry. The overflow liquor is subsequently heated by indirect heat exchange with flashed vapor and live steam. The heavy slurry is heated by direct steam contacting, if desired, and then joined with the heated fine-mud stream for holding at a desired digestion temperature.

The very fine mud in the overflow liquor provides a mild polishing action in the tubular heaters, and the DSP in the liquor provides seed for deposition of precipitating DSP, thus minimizing scaling in the heating surfaces.

Use of all or the major portion of the spent liquor stream in the low temperature digest provides a notable improvement in digestion heat balance. Dissolving about 50% of the alumina at a heat of solution requirement of 250 Btu/lb. $Al_2O_3$ in low-temperature digest significantly reduces the heat requirement for high-temperature digestion. The settled slurry going to further digestion is so greatly reduced in volume and heat requirement that little or no further separate heating is required. This permits substantially all of the heat required to be supplied indirectly, thus eliminating dilution entirely and enabling a net saving in plant evaporation load.

Control of digestion alumina to caustic ratios is greatly enhanced since large surge volumes of homogeneous settled slurry and constant-ratio liquor are available for blending in high-temperature digestion.

When a major portion of the liquor flow is used in the low-temperature digestion step, the suspended solids content in the effluent liquor is low, generally less than 5%. The desired desilication of the liquor generally requires a holding time of about 6–8 hours for the liquor in intimate contact with desilicating mud.

For this holding step with adequate contacting of liquor and solid for desilication, a series of tanks may be employed. When this is done, the liquor from low temperature digestion containing bauxite generally finer than 80–100 mesh is fed into the first tank in the series. Settled slurry is drawn off the bottom, recirculated back to the same tank, if desired, and fed forward to the next tank at a rate controlled to maintain a desired level of heavy solids. The overflow of liquor from the upper portion of the tank contains fine solids, generally less than 250 mesh (U.S. Sieve Series) in size. Overflow liquor from the first tank passes through heaters en route to digestion holding vessels, and underflow slurry is fed at a desired rate through a contact heater, if desired, to join the heated liquor stream.

For the separation step, as just described, a plurality of tanks may be employed, which may be referred to as slurry storage tanks. Part of the high-solids portion which settles to and leaves the lower part of each tank may be recycled to the top of the tank, the remainder passing on to the next tank in series until settling in the final tank. The fines portion from the top of the first tank is conducted to the top part of the second tank and settled therein with the result that the fines portion leaving the last tank of the series has a low solids content and is a desilicated liquor which will cause little, if any, erosion problems in the tubular heaters through which it is conducted before being rejoined by a high-solids coarse portion leaving the lower part of the last tank of the tubular heater series. If desired, instead of conducting the two portions directly to the next treatment stage after rejoining them, the resulting stream may be conducted first through a heat exchanger of the well known contact-heater type, which does not contain tubes which might be detrimentally affected by erosion caused by the high-solids, coarse portion.

According to a still further embodiment, the two portions need not be reunited until entering the pressure digester separately.

According to a preferred embodiment of my invention the slurry separated into two portions and then reunited prior to pressure digestion comes from atmospheric digestion of bauxite, for example, as described in my aforementioned U.S. Pat. No. 3,681,013, wherein bauxite is preliminarily subjected to a caustic atmospheric digestion step in which the caustic is flowed countercurrently to the direction of flow of the bauxite, to carry with it finer particles and alumina extracted from remaining coarse particles in the +80 −100 mesh range, which are thereby separated and eliminated as a potential cause of erosion during heat exchange prior to pressure digestion.

BRIEF DESCRIPTION OF THE DRAWING

For a better understanding of the invention, reference will now be made to the drawing, which illustrates certain preferred embodiments of the invention.

In the drawing.

DESCRIPTION OF THE PREFERRED EMBODIMENTS

Figure 1:
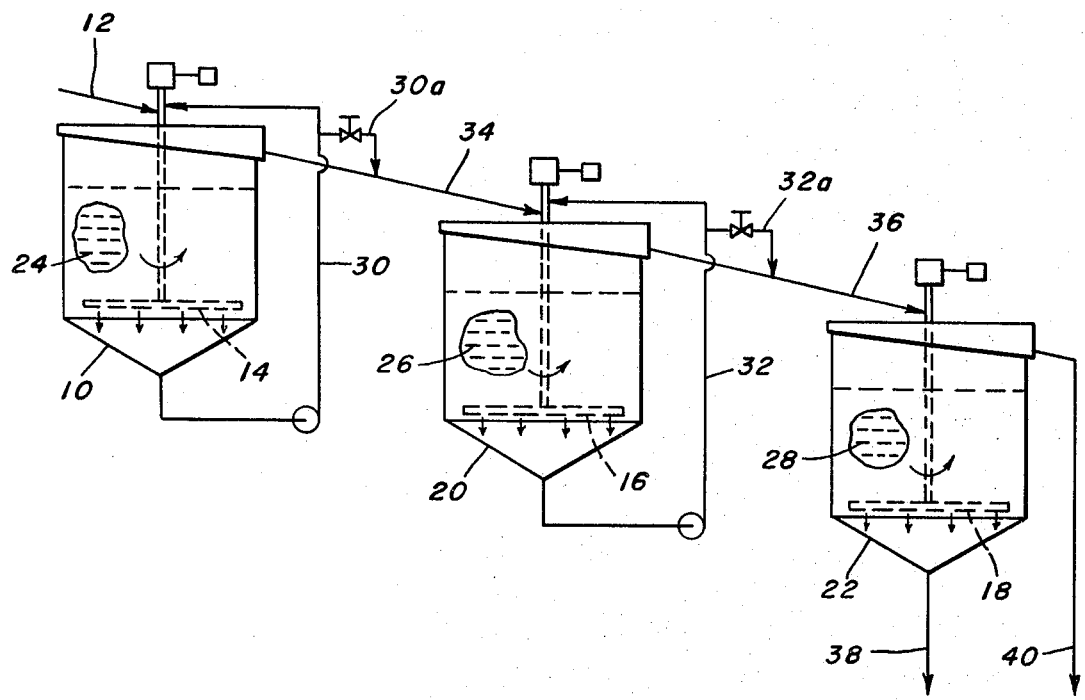
FIG. 1 is a schematic representation of an illustrative slurry storage-desilication system useful according to the invention.
Figure 2:
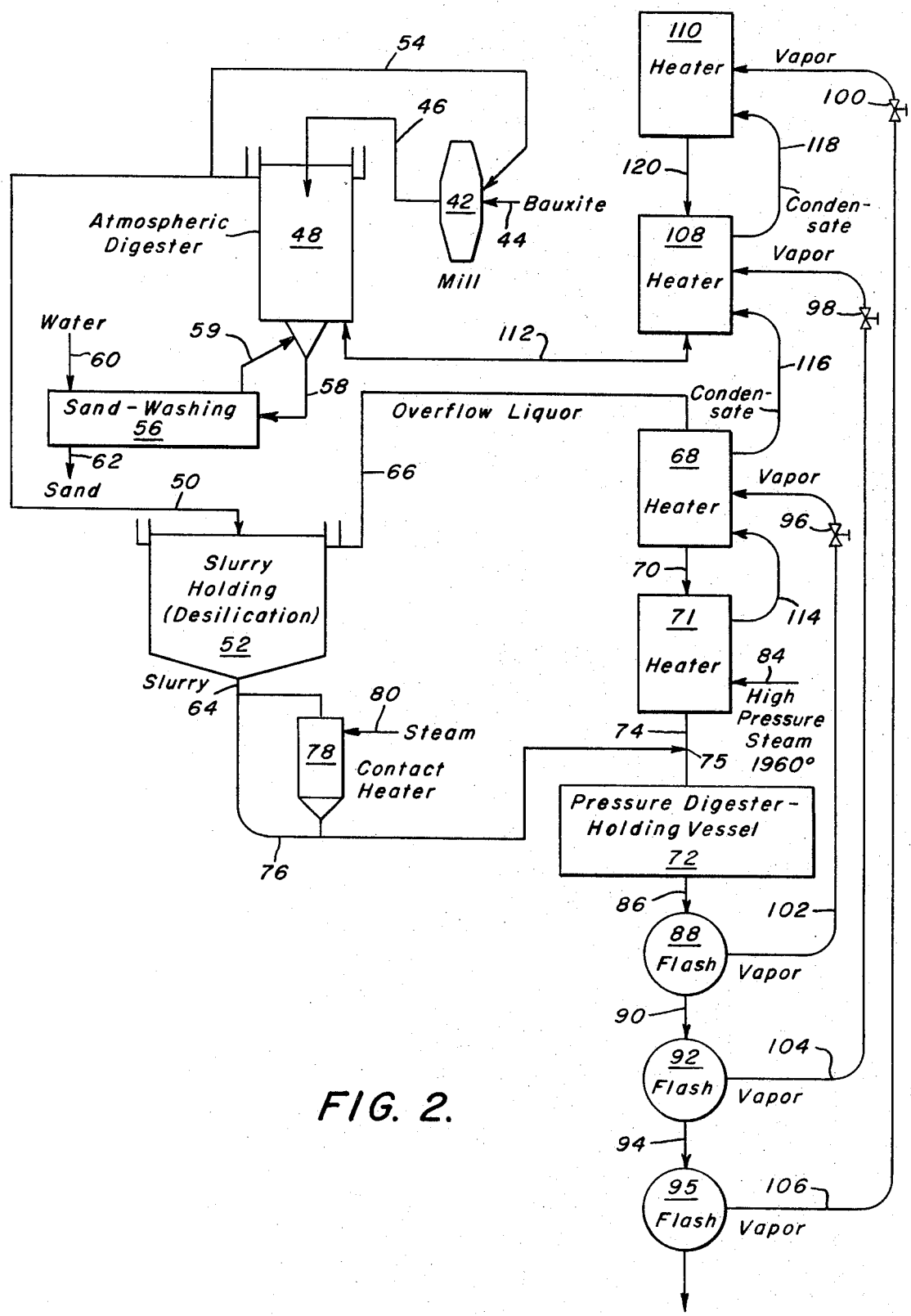
FIG. 2. is a schematic representation in flow-sheet form showing improved slurry separation and reunion according to the invention as well as preliminary and subsequent digestion and related steps for extraction of alumina from bauxite.

In FIG. 1, a 5–10% solids slurry resulting from caustic treatment of bauxite enters tank 10 via line 12. Rotating sparge arms 14 in tank 10 and similar rotating sparge arms 16 and 18 in like vessels 20 and 22 in series with tank 10 introduce the slurry to and circulate it in this plurality of slurry storage and desilication tanks. In each tank solids settle to about 20–35% by weight, the liquor flows upward through a teeter bed of solids 24, 26 and 28 in such a manner that a large seed area is provided for desilication. Sufficient heavy slurry is drawn from the bottom and circulated back to the top of the first two tanks 10 and 20 via respective lines 30 and 32 to prevent settle-out, the remainder in each instance passing on to the next successive tank via respective lines 30a and 30a. Sufficient slurry is advanced from tank 10 to tank 20 via line 34 and from tank 20 to tank 22 via line 36 at a controlled rate to maintain a high level of settled solids in each tank for maximum storage volume and to provide a clarification zone in the upper portion of each tank for overflow of liquor containing fine solids via lines 34 and 36. Slurry residence time from introduction of slurry to tank 10 to exit from tank 22 generally varies from about 16 to 24 hours, with liquor residence time varying from about 6 to 10 hours. Most of the desilication occurs in about 8 hours. Settled 35% solids slurry (−80 mesh) leaves the lower portion of the tank 22 via line 38 and an overflow fines liquor (−250 mesh low-solids desilicated) via line 40, the latter passing through one or more tubular indirect heaters before being joined by the former prior to entering a pressure digester (not shown). The bauxite charging ratio for the slurry entering the pressure digester is thus adjusted by blending the low solids and high solids portions from the slurry storage and desilication tanks In FIG. 2, bauxite enters grinding zone 42 via line 44. After grinding, it is conducted via line 46 to a classification and atmospheric digest zone 48, from which a fines portion is conducted via line 50 to a desilication-slurry storage zone 52, which may comprise a single settling tank or plurality of tanks such as those depicted in FIG. 1. A portion of the overflow liquor is recycled via line 54 for slurrying the bauxite in 42. A coarse fraction from which alumina has been extracted by atmospheric digestion in zone 48 enters sand washing zone 56 via line 58. Water enters zone 56 via line 60, and sand disposal leaves it via line 62. Enriched water from sand washing enters the digestion column 48 via line 59. In zone 52 slurry is separated into a high-solids coarse (−80 mesh) portion, which leaves via line 64, and a low-solids fines (−250 mesh) portion, which leaves via line 66. The low-solids fines portion ia conducted through tubular heater 68 and then via line 70 to tubular heater 71, from which it is conducted to pressure digester-holding vessel 72 via line 74. The high-solids coarse portion is conducted via line 76 to pressure digestion zone 72, after passing, if desired, through contact heater 78 (non-tubular) (optional), which steam enters at 80. It may be joined by the low solids fines portion at 75 before entering pressure digester-holding vessel 72. Steam also enters tubular heater 71 at 84. Sodium aluminate liquor leaving zone 72 via line 86 is first flash cooled at zone 88 and then conducted through line 90 to flash cooling zone 92 prior to being led via line 94 to a second flash cooling zone 95 and then settling, filtration and further cooling zones (not shown) in advance of precipitation of alumina therefrom.

Slurry is brought back to atmospheric pressure via respective flash tanks 88, 92 and 95. Control valves 96, 98 and 100 in vapor lines 102, 104 and 106, which lead respectively to heaters 68, 108 and 110 control vapor release from flash tanks 88, 92 and 95. The temperature of recycle liquor to the atmospheric digestion line 112 is controlled in cascade fashion by the operation of control valves 96, 98 and 100. Condensate passes via line 114 from heater 71 to heater 68, via line 116 from heater 68 to heater 108 and via line 118 from heater 108 to heater 110. Liquor passes from heater 110 to heater 108 via line 120.

While the invention has been described in terms of preferred embodiments, the claims appended hereto are intended to encompass all embodiments which fall within the spirit of the invention.

Having discribed my invention and certain embodiments thereof, I claim:

1. In a process for preparation of sodium aluminate liquor by formation of a caustic slurry of bauxite at atmospheric pressure with subsequent high-pressure digestion thereof, the improvement which comprises, after said formation of said caustic slurry, and prior to pressure digestion forming a desilication product in a holding zone containing said slurry by combination of dissolved silica with alumina and caustic to form an insoluble sodium aluminum silicate, separating said slurry into a high-solids coarse portion comprising material more than 200 mesh in size and a low-solids fines portion comprising material less than 200 mesh in size, conducting said low-solids fines portion through at least one indirect heat exchanger, whereby said low-solids fines portion is heated, and thereafter reuniting said high-solids coarse portion with said low-solids fines portion for subsequent high-pressure digestion.

2. The improvement of claim 1 wherein the holding zone comprises a classification zone wherein said low-solids fines portion is overflowed and said high-solids coarse portion is settled.

3. The improvement of claim 1 wherein the separating of the slurry into the high-solids portion and the coarse solids portion takes place in a plurality of tanks arranged in series.

4. The improvement of claim 1 wherein said slurry to be separated into said low-solids portion and said high-solids portion contains from about 5% to about 10% by weight solids and the resulting high-solids portion contains at least about 30% by weight solids.

5. In a process for preparation of sodium aluminate liquor by atmospheric digestion of bauxite followed by high-pressure digestion, the improvement which comprises, after said atmospheric digestion, forming a slurry containing desilication product by combination of dissolved silica with alumina and caustic to form an insoluble sodium aluminum silicate, in a classification zone separating said slurry into a high-solids coarse (−80 mesh) portion and a low-solids fines (−250 mesh) portion, conducting the low-solids portion through a plurality of tubular heat exchangers whereby said portion is heated, and reuniting the high-solids portion with the low-solids portion for high-pressure digestion.

6. The improvement of claim 5 wherein the classification zone comprises a plurality of tanks in series.

7. In a two-stage process for recovery of alumina from bauxite wherein a coarse bauxite fraction is separated—in an atmospheric digest—from a fines fraction comprising alumina-rich liquor containing dissolved silica and bauxite generally finer than 80–100 mesh, the improvement which comprises:

conducting said alumina-rich liquor containing said bauxite fines and dissolved silica to one or more holding and settling tanks to provide sufficient time to complete a major portion of a desilication reaction by combination of said dissolved silica with alumina and caustic in said liquor to form insoluble sodium aluminum silicate desilication product, adjusting the settling rates so as to permit an overflow fines liquor containing solids less than 250 mesh in size and including said desilication product to overflow said holding tanks, while accumulating coarser solids as a thick slurry, subsequently heating said overflow liquor containing said fine muds by indirect heat exchange with flashed vapor and live steam, then joining said thick slurry with said heated overflow liquid for subsequent high-pressure, high-temperature digestion.

8. The improvement of claim 7 wherein the thick slurry is also heated by direct steam contacting.

* * * * *